United States Patent
Lim et al.

(10) Patent No.: US 11,893,753 B2
(45) Date of Patent: Feb. 6, 2024

(54) SECURITY CAMERA AND MOTION DETECTING METHOD FOR SECURITY CAMERA

(71) Applicant: PixArt Imaging Inc., Hsin-Chu (TW)

(72) Inventors: Kevin Len-Li Lim, Penang (MY); Joon Chok Lee, Penang (MY); Zi Hao Tan, Penang (MY); Ching Geak Chan, Penang (MY); Keen-Hun Leong, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 147 days.

(21) Appl. No.: 16/937,612

(22) Filed: Jul. 24, 2020

(65) Prior Publication Data
US 2021/0065385 A1 Mar. 4, 2021

(30) Foreign Application Priority Data
Aug. 27, 2019 (MY) .............................. PI2019004948

(51) Int. Cl.
G06T 7/20 (2017.01)
H04N 7/18 (2006.01)
G06T 7/254 (2017.01)
G06T 7/246 (2017.01)

(52) U.S. Cl.
CPC .............. *G06T 7/254* (2017.01); *G06T 7/248* (2017.01); *H04N 7/18* (2013.01)

(58) Field of Classification Search
None
See application file for complete search history.

(56) References Cited

U.S. PATENT DOCUMENTS

| | | | | |
|---|---|---|---|---|
| 6,493,041 B1 * | 12/2002 | Hanko | ................... | H04N 5/144 348/169 |
| 9,001,207 B1 * | 4/2015 | Webb | ................... | H04N 19/137 348/143 |
| 11,017,243 B2 * | 5/2021 | Titley | ..................... | H04N 7/183 |
| 11,232,685 B1 * | 1/2022 | Nixon | ................... | H04N 7/186 |
| 2005/0041156 A1 * | 2/2005 | Kondo | ................... | H04N 5/145 348/700 |
| 2006/0227862 A1 * | 10/2006 | Campbell | .............. | G06V 20/53 375/240 |
| 2012/0162416 A1 * | 6/2012 | Su | .......................... | G06V 20/53 348/143 |

(Continued)

*Primary Examiner* — Randolph I Chu
(74) *Attorney, Agent, or Firm* — Winston Hsu

(57) ABSTRACT

A security camera with a motion detection function, which comprises: an image sensor, configured to capture original images; a variation level computation circuit, configured to compute image variation levels of the original images; a long term computation circuit, configured to calculate a first average level for the image variation levels corresponding to M of the original images; a short term computation circuit, configured to calculate a second average level for the image variation levels corresponding to N of the original images, wherein M>N; and a motion determining circuit, configured to determine whether a motion of an object appears in a detection range of the image sensor according to a relation between the first average level and the second average level. By such security camera, the interference caused by noise or small object can be avoided. Accordingly, the motion detection of the security camera can be more accurate.

7 Claims, 9 Drawing Sheets

(56) References Cited

U.S. PATENT DOCUMENTS

| | | | | |
|---|---|---|---|---|
| 2012/0274845 | A1* | 11/2012 | Motoyama | H04N 7/0115 |
| | | | | 348/441 |
| 2016/0278627 | A1* | 9/2016 | Huang | A61B 3/0041 |
| 2016/0328629 | A1* | 11/2016 | Sinclair | B60Q 9/008 |
| 2020/0027337 | A1* | 1/2020 | Cruz Huertas | G08B 27/003 |
| 2020/0167938 | A1* | 5/2020 | Matzner | G06V 10/143 |
| 2020/0293769 | A1* | 9/2020 | Townsend | G06T 7/11 |

\* cited by examiner

FIG. 7

Subtraction image

| ABS(FR$_{1,1}$ - FC$_{1,1}$) | ABS(FR$_{2,1}$ - FC$_{2,1}$) | ABS(FR$_{3,1}$ - FC$_{3,1}$) | | ABS(FR$_{N-2,1}$ - FC$_{N-2,1}$) |
|---|---|---|---|---|
| ABS(FR$_{1,2}$ - FC$_{1,2}$) | ABS(FR$_{2,2}$ - FC$_{2,2}$) | ABS(FR$_{3,2}$ - FC$_{3,2}$) | - | - |
| ABS(FR$_{1,3}$ - FC$_{1,3}$) | ABS(FR$_{2,3}$ - FC$_{2,3}$) | ABS(FR$_{3,3}$ - FC$_{3,3}$) | - | - |
| - | - | - | - | - |
| ABS(FR$_{1,N-2}$ - FC$_{1,N-2}$) | - | - | - | ABS(FR$_{N-2,N-2}$ - FC$_{N-2,N-2}$) |

FIG. 8

SECURITY CAMERA AND MOTION DETECTING METHOD FOR SECURITY CAMERA

CROSS REFERENCE TO RELATED APPLICATION

This application claims the benefit of Malaysia Application No. PI2019004948, filed on 2019 Aug. 27, the contents of which are incorporated herein by reference.

BACKGROUND OF THE INVENTION

1. Field of the Invention

The present invention relates to a security camera and a motion detecting method for the security camera, and particularly relates to a security camera and a motion detecting method for the security camera, which can avoid interference caused by noise or small objects around.

2. Description of the Prior Art

Recently, security cameras with a motion detection function become more and more popular. A user can buy a professional security camera from a supplier and request the supplier to install it to the user's house. Besides, a user can buy a cheaper security camera and installs it by himself. The security camera can be used to monitor if any one comes closer or to monitor if anything abnormal occurs. However, some noises in the environment, such as ambient light or minor shift of small objects (i.e. non-desired object) such as leafs or flags, may cause wrong determination of the security camera.

SUMMARY OF THE INVENTION

Therefore, one objective of the present invention is to provide a security camera which can avoid interference caused by noise or small object.

Another objective of the present invention is to provide a motion detecting method which can avoid interference caused by noise or small object.

One embodiment of the present invention provides a security camera with a motion detection function, which comprises: an image sensor, configured to capture a plurality of original images; a variation level computation circuit, configured to compute image variation levels of the original images; a long term computation circuit, configured to calculate a first average level for the image variation levels corresponding to M of the original images; a short term computation circuit, configured to calculate a second average level for the image variation levels corresponding to N of the original images, wherein M>N; and a motion determining circuit, configured to determine whether a motion of an object appears in a detection range of the image sensor according to a relation between the first average level and the second average level.

Another embodiment of the present invention provides a security camera with a motion detection function, which comprises: an image sensor, configured to capture a plurality of original images; a control circuit, configured to select a plurality of original reference images from the original images; a variation level computation circuit, configured to subtract each of comparison images with each of reference images pixel by pixel to acquire subtraction images, to count a number of pixels in each of the subtraction image whose pixel value is greater than a variation threshold, to generate over threshold pixel numbers representing image variation levels, wherein the comparison images correspond to the original c images, and the reference images correspond to the original reference images; and a motion determining circuit, configured to determine whether a motion of an object occurs a detection range of the image sensor according to a relation between a motion threshold and the over threshold pixel numbers.

Still embodiment of the present invention provides a motion detecting method for a security camera comprising an image sensor, which comprises: (a) capturing a plurality of original images by the image sensor; (b) computing image variation levels of the original images; (c) calculating a first average level for the image variation levels corresponding to M of the original images; (d) calculating a second average level for the image variation levels corresponding to N of the original images, wherein M>N; and (e) determining whether a motion of an object appears in a detection range of the image sensor according to a relation between the first average level and the second average level.

In view of above-mentioned argument, the interference caused by noise or small object can be avoided. Accordingly, the motion detection of the security camera can be more accurate.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5-FIG. 8 are schematic diagrams illustrating operations of the security camera in FIG. 4 according to one embodiment of the present invention.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different elements, and do not mean the sequence of the elements. For example, a first device and a second device only mean these devices can have the same structure but are different devices.

In following embodiment, two terms "object" and "small object" are used. The term "object" means a big object or an object which is desired to be detected, such as a person, an animal or a vehicle, thus can also be called a target object. Also, the term "small object" means a small object which is desired to be filtered, such as a leaf, a paper, or a flag, an insect, thus can also be called a non-desired object.

Figure 1:
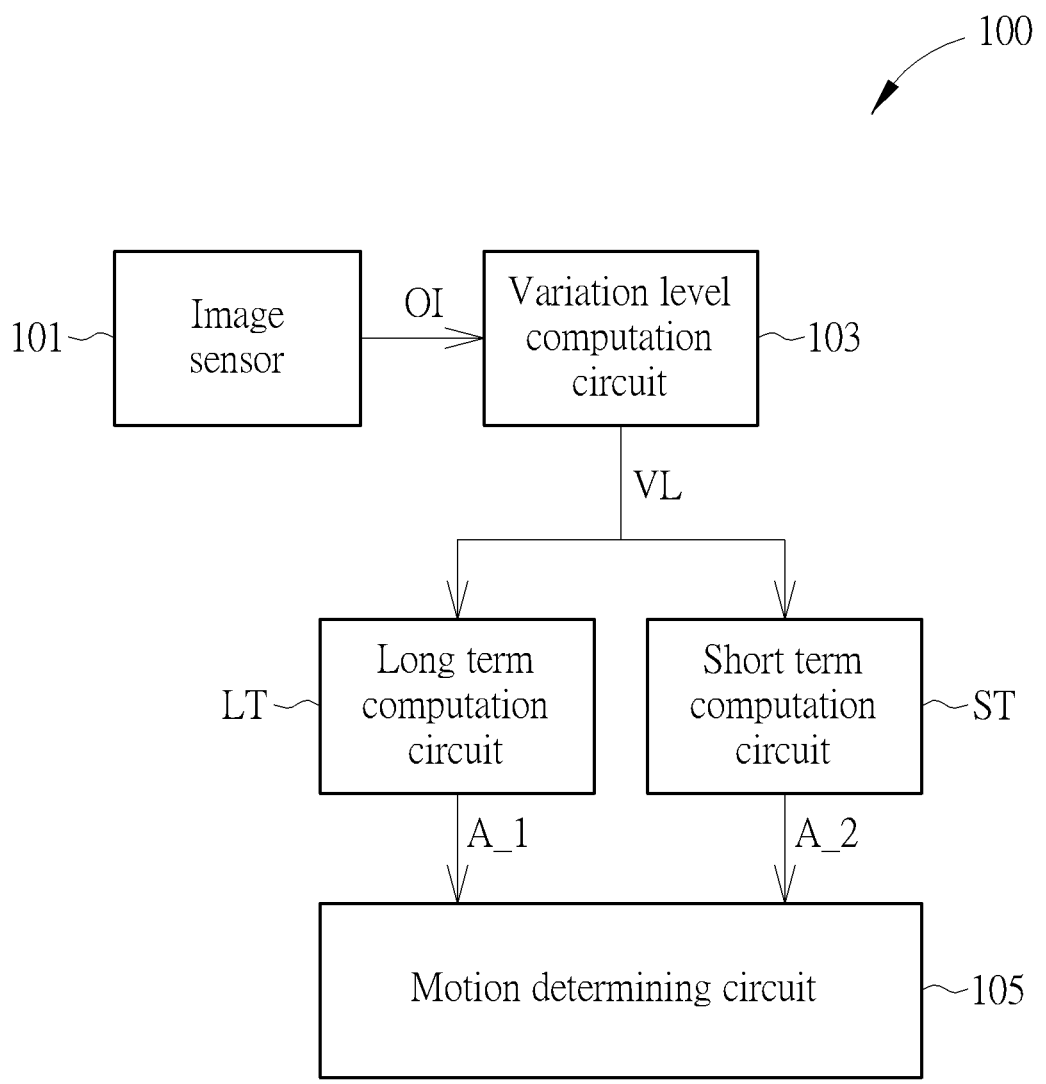
FIG. 1 is a block diagram illustrating a security camera according to one embodiment of the present invention.

FIG. 1 is a block diagram illustrating a security camera according to one embodiment of the present invention. As illustrated in FIG. 1, the security camera 100 comprises an image sensor 101, a variation level computation circuit 103, a long term computation circuit LT, a short term computation circuit ST, and a motion determining circuit 105. The image sensor 101 is configured to capture a plurality of original images OI. The variation level computation circuit 103 is configured to compute an image variation level VL of the original images OI.

Also, the long term computation circuit LT is configured to calculate a first average level A_1 for the image variation levels VL corresponding to M of the original images OI. Further, the short term computation circuit ST is configured to calculate a second average level A_2 for the image variation levels VL corresponding to N of the original images OI. The first average level A_1 and the second average level A_2 may be calculated by following Equation (1) and Equation (2), but not limited. M, N are positive integers and M>N, for example, M=64, and N=16. M and N may be set corresponding to a location of the security camera 100 or any other requirements.

$$A\_1=[VL\_1+VL\_2+ \ldots +VL\_M-1]/M \quad \text{Equation (1)}$$

$$A\_2=[VL\_1+VL\_2+ \ldots +VL\_N-1]/N \quad \text{Equation (2)}$$

The Equation (1) and Equation (2) could be implemented by running average (i.e. moving average) method to reduce hardware requirement. For example, to obtain the first average level A_1, a value SUM_A (the initial value of SUM_A could be the image variation level VL_1) is updated by adding the value of image variation levels VL_2, ... VL_M-1 sequentially. Then the first average level A_1 could be determined by averaging the updated SUM_A with the value M (A_1=SUM_A/M).

Briefly, the first average level A_1 and the second average level A_2 are average image variation levels of a plurality of original images OI. The first average level A_1 correspond to more original images OI but the second average level A_2 correspond to less original images OI.

The motion determining circuit 105 is configured to determine whether a motion of an object (e.g. a person, an animal or a vehicle) occurs in a detection range of the image sensor 101 according to a relation between the first average level A_1 and the second average level A_2. In one embodiment, the motion determining circuit 105 determines whether the motion of the object occurs in the detection range of the image sensor 101 (i.e. the detection range of the security camera 100) according to a relation between a motion threshold and a difference between the first average level A_1 and the second average level A_2. Specifically, if the difference is larger than the motion threshold, the motion determining circuit 105 determines that the object appears in the detection range (i.e. a motion of an object occurs). On the contrary, if the difference is smaller than the motion threshold, the motion determining circuit 105 determines that the object does not appear in the detection range. In other words, the larger the difference between the first average level A_1 and the second average level A_2, the higher of the probability that the motion of the object exists.

Via using the long term computation circuit LT and the short term computation circuit ST, wrong determination of the security camera 100 can be avoided. For example, if no object appears in the detection range, the difference should be very small or less than a predetermined threshold (i.e. motion threshold). Also, if some small objects such as leafs, papers, or flags have minor motions in the detection range, the difference is smaller than the motion threshold. Further, if some noises occur, such as flickers of images captured by the image sensor 101, the difference is also smaller than the motion threshold. Additionally, if an object appears in the detection range, the difference is larger than the motion threshold. After the motion determining circuit 105 determines a motion of an object occurs, the security camera 100 may correspondingly operate. For example, the security camera 100 can initially operate in a sleep mode and switches to an active mode to record images if the motion of an object occurs. For another example, the security camera 100 can generate message to inform the user if the motion of an object occurs.

Figure 2:
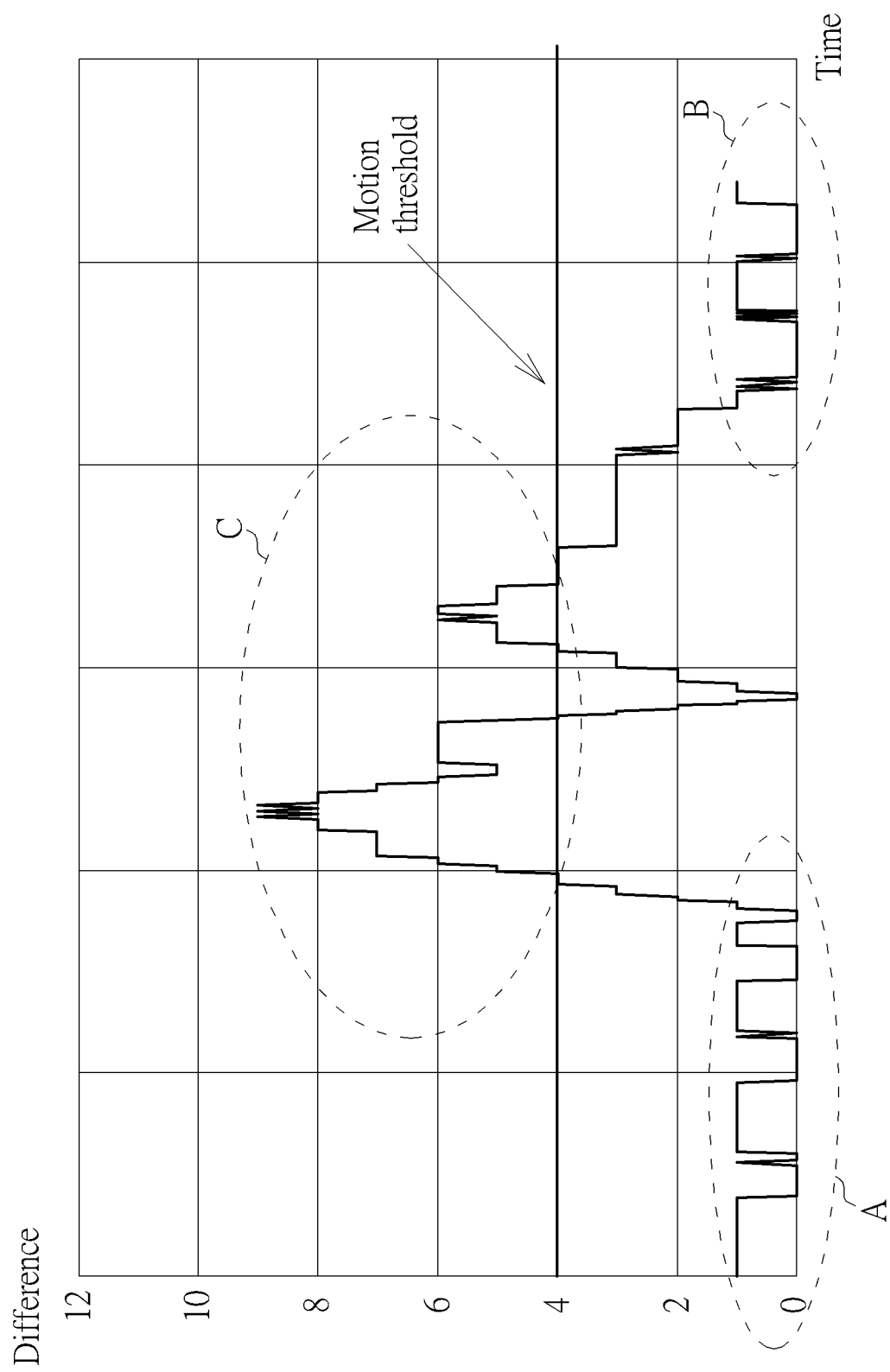
FIG. 2 is a schematic diagram illustrating the motion threshold and the differences according to one embodiment of the present invention.

FIG. 2 is a schematic diagram illustrating the motion threshold and the differences according to one embodiment of the present invention. As illustrated in FIG. 2, in the regions A and B, the first average level A_1 and the second average level A_2 have small differences due to noises. However, the differences are smaller than the motion threshold, thus the security camera 100 will not determine motion of an object occurs. In the region C, an object appears in the detection range, thus the difference is larger than the motion threshold and the security camera 100 determine the motion of an object occurs.

In one embodiment, the motion threshold has inverse association with the detection range. That is, the motion threshold is smaller when the detection range is larger. On the opposite, the motion threshold is larger when the detection range is smaller. The advantage of such mechanism is, if the detection range is larger, the motion caused by noise or by a small object occupies only a small portion of the whole image sensed by the image sensor 101, thus the corresponding difference between the first average level A_1 and the second average level A_2 is also smaller. Accordingly, the motion threshold should be set to be smaller in such case. On the contrary, if the detection range is smaller, the motion caused by noise or by a small object occupies a larger portion of the whole image sensed by the image sensor 101, thus the corresponding difference between the first average level A_1 and the second average level A_2 is larger. Therefore, in such case the motion threshold should be set to be larger.

Figure 3:
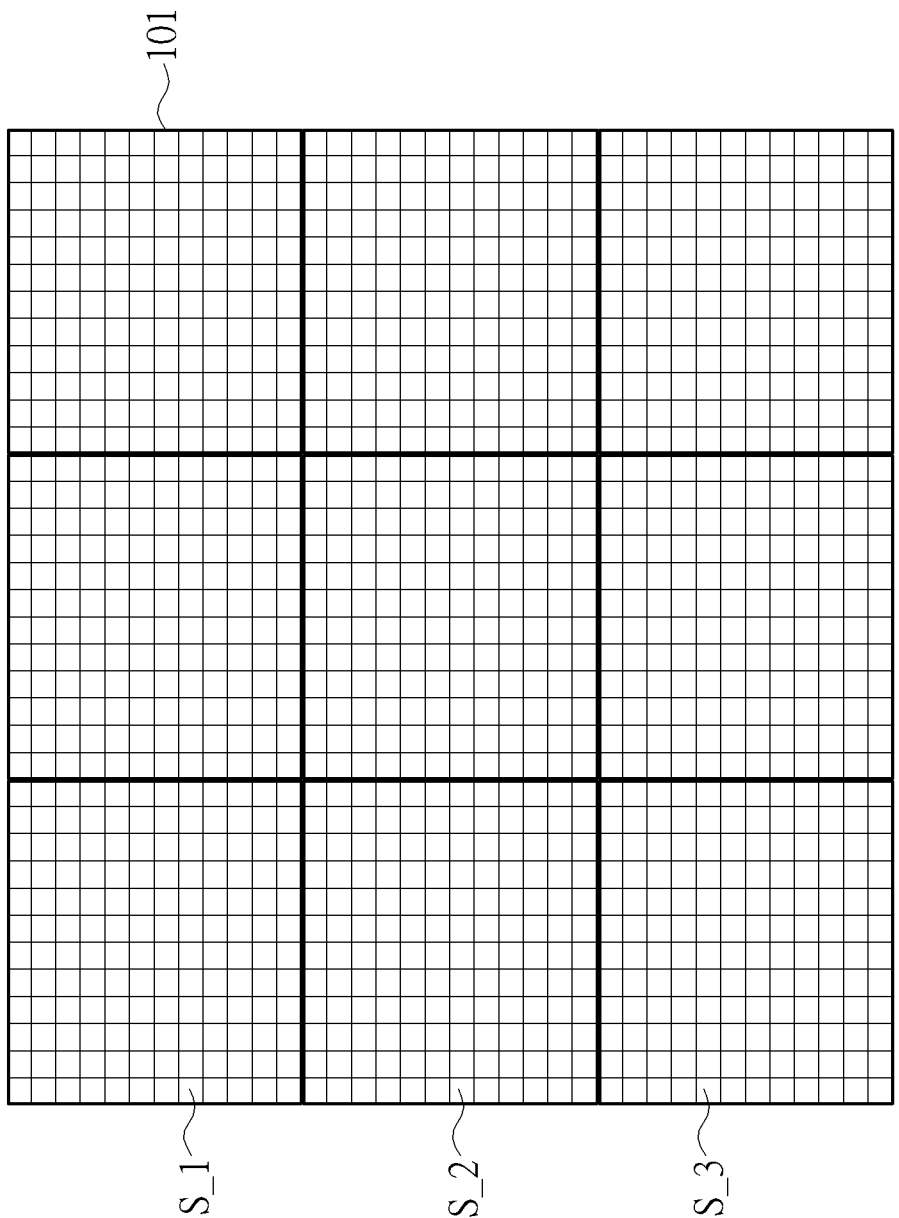
FIG. 3 is a block diagram illustrating a security camera with a plurality of sensing regions according to one embodiment of the present invention.

In one embodiment, the image sensor 101 may comprises a plurality of sensing regions. Such as the sensing regions S_1, S_2 and S_3 in FIG. 3 (only three of them are marked). In such case, different sensing regions may have different motion thresholds. That is, at least two sensing regions have different motion thresholds. The advantage of such mechanism is that the security camera 100 may have a better accuracy of motion determination, since the motion thresholds of sensing regions can be set corresponding to different requirements. For example, if a user finds a specific region of the image captured by the security camera 100 always have noise or motion caused by small objects after the security camera 100 is installed, such specific region can be set to have a larger motion threshold. On the contrary, if a user finds a specific region of the image captured by the security camera 100 never or rarely have noise or motion caused by small objects after the security camera 100 is installed, such specific region can be set to have a smaller motion threshold.

Figure 4:
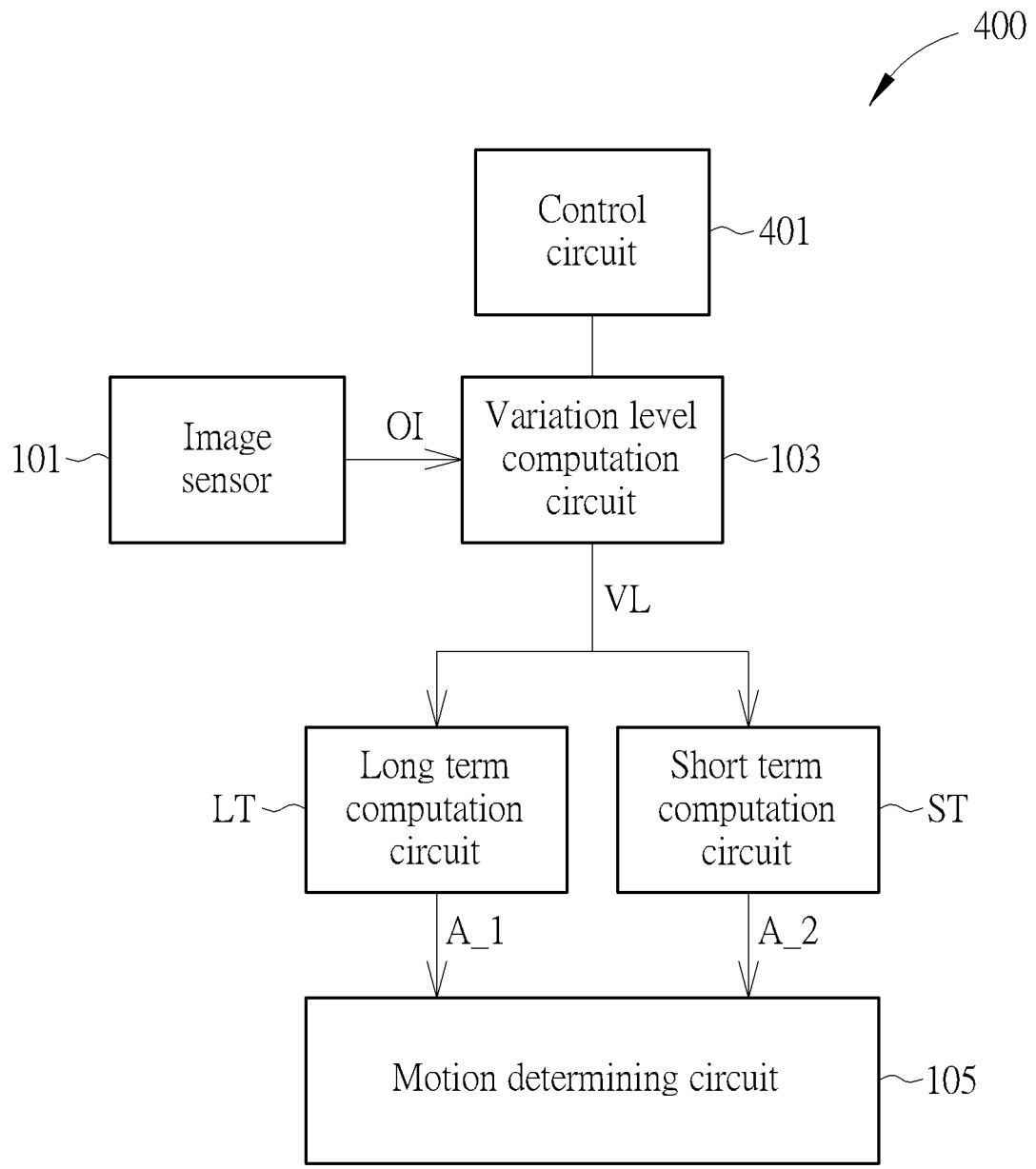
FIG. 4 is a block diagram illustrating a security camera according to another embodiment of the present invention.

Various methods can be applied to compute the above-mentioned image variation level VL. FIG. 4 is a block diagram illustrating a security camera according to another embodiment of the present invention. FIG. 5-FIG. 8 are schematic diagrams illustrating operations of the security camera in FIG. 4 according to one embodiment of the present invention. Please also refer to FIG. 4 while referring FIG. 5-FIG. 8, to understand the concept of the present invention for more clarity.

Figure 5:
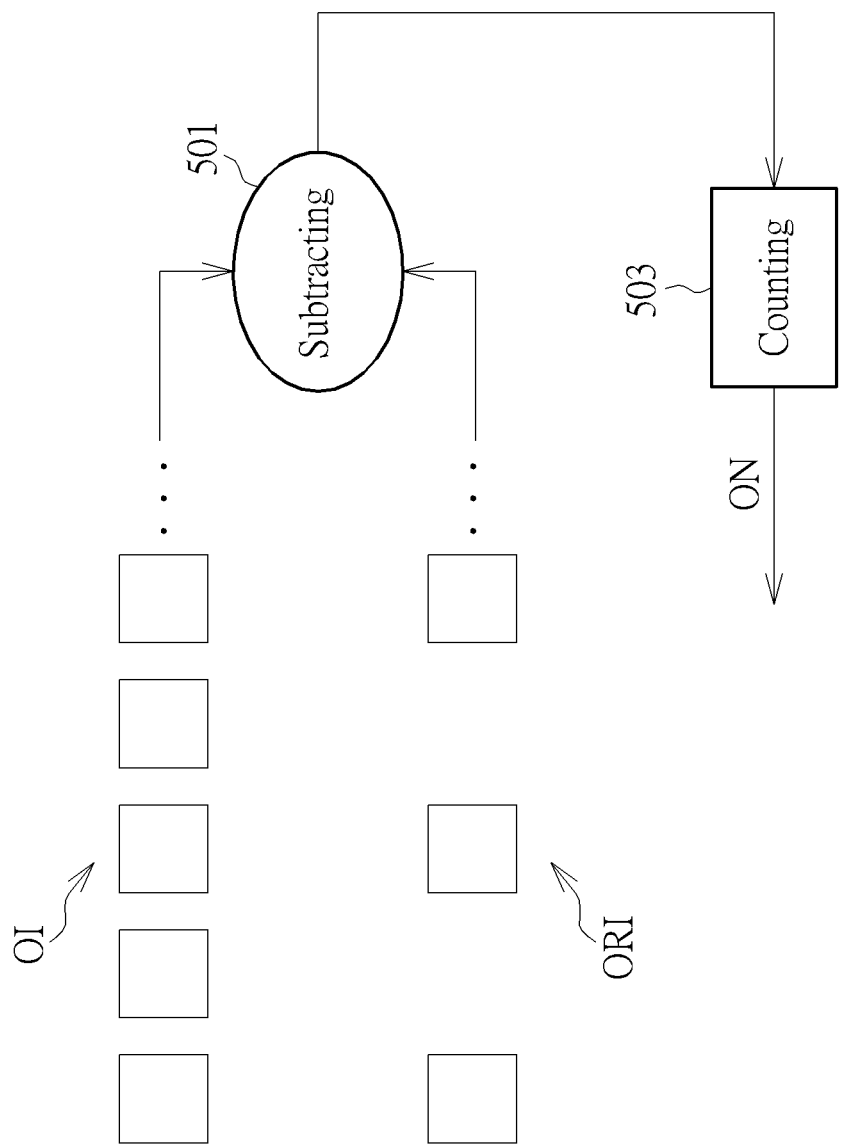

As shown in FIG. 4, the security camera 400 further comprises a control circuit 401 besides the components illustrated in FIG. 1. In the embodiment of FIG. 4, the image sensor 101 is configured to sense a plurality of original images OI. Also, the control circuit 401 is configured to select a plurality of original reference images ORI from the original images OI, as shown in FIG. 5. One original reference image ORI can correspond to one original image OI or correspond to a plurality of original images OI. If one reference image ORI corresponds to one original image OI, it means the original reference images ORIs and the original image OIs are the same. In following embodiments, the original reference images ORIs and the original image OIs are the same.

After the original reference images ORIs are selected, the variation level computation circuit 103 computes the image variation levels VL of the original images OI via computing image variation levels corresponding to each of comparison images and each of reference images. The comparison images correspond to the original images OI, and the reference images correspond to the original reference images ORI. In the embodiment of FIG. 5, the comparison images are the same as the original images OI, and the reference images are the same as the original reference images ORI.

For more detail, the control circuit 401 performs the step 501 to subtract each of the comparison images (original image OI) with each of the reference images (original reference image ORI) pixel by pixel to acquire subtraction images. Further, the control circuit 401 performs the step 503 to count a number of pixels in each the subtraction image whose pixel value is greater than a variation threshold, to generate over threshold pixel numbers representing the image variation levels. For example, if the subtraction image has 10000 pixels and 8000 of the pixels have pixel values greater than the variation threshold. It may mean the image variation level is large since the original image OI and a corresponding original reference image thereof have many differences. On the contrary, if the subtraction image has 10000 pixels and only 80 of the pixels have pixel values greater than the variation threshold. It may mean the image variation level is small since the original image OI and a corresponding original reference image ORI are similar. In one embodiment, the variation threshold corresponds to an operating environment of the security camera. The operating environment parameter can be, for example, a temperature or a humidity.

However, the comparison images are not limited to be the same as the original images OI, and the reference images are not limited to be the same as the original reference images ORI. For example, in one embodiment, a filtering circuit (not shown) is be provided between the image sensor 101 and the variation level computation circuit 103. The filtering circuit is configured to filter a portion of pixels of the original images OI to generate the comparison images CI, and configured to filter a portion of pixels of the original reference images ORI to generate the reference images RI, as shown as the step 601 in FIG. 6. The control circuit 401 performs the step 603 to subtract each of the comparison images CI with each of the reference images RI pixel by pixel to acquire subtraction images. Further, the control circuit 401 performs the step 605 to count a number of pixels in each the subtraction image whose pixel value is greater than a variation threshold, to generate over threshold pixel numbers representing the image variation levels.

Figure 6:
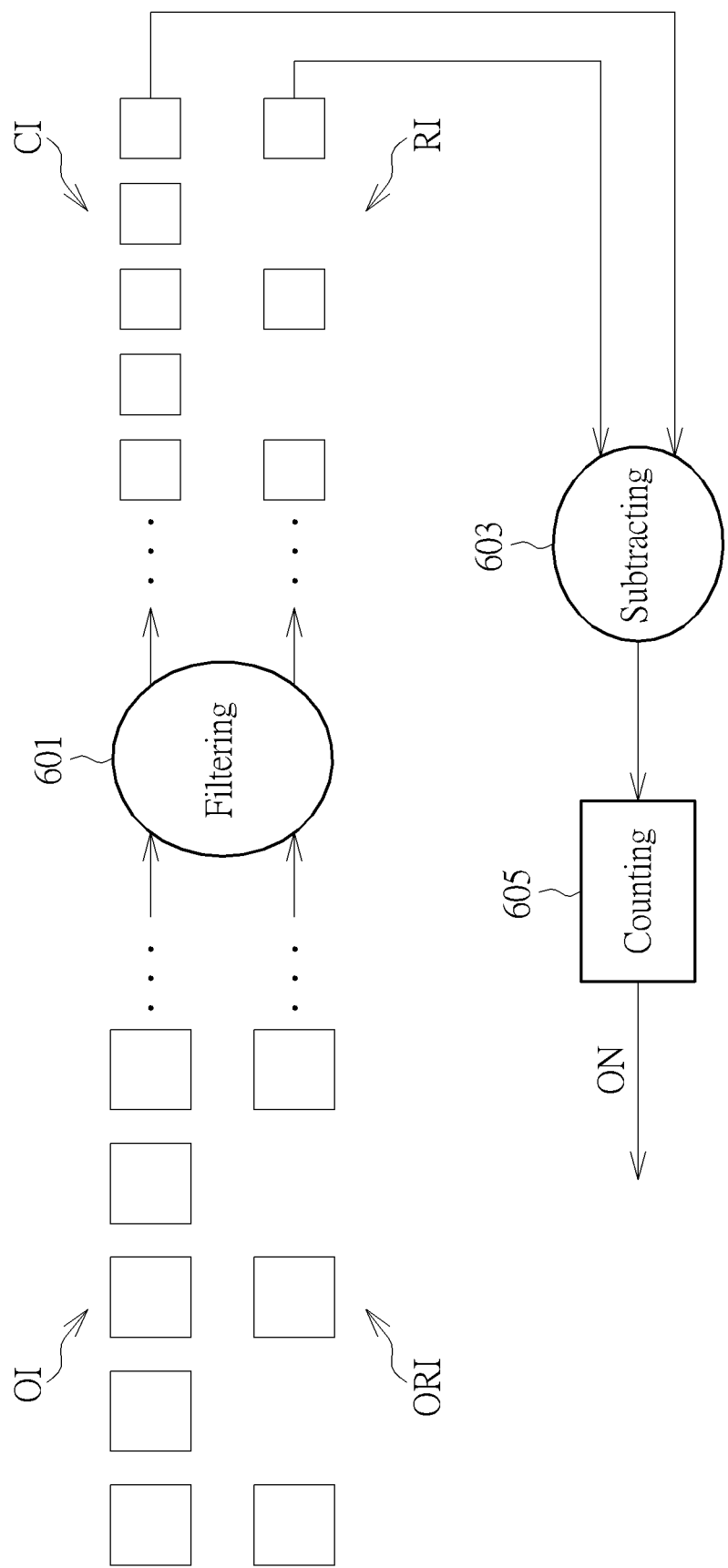
Figure 7:
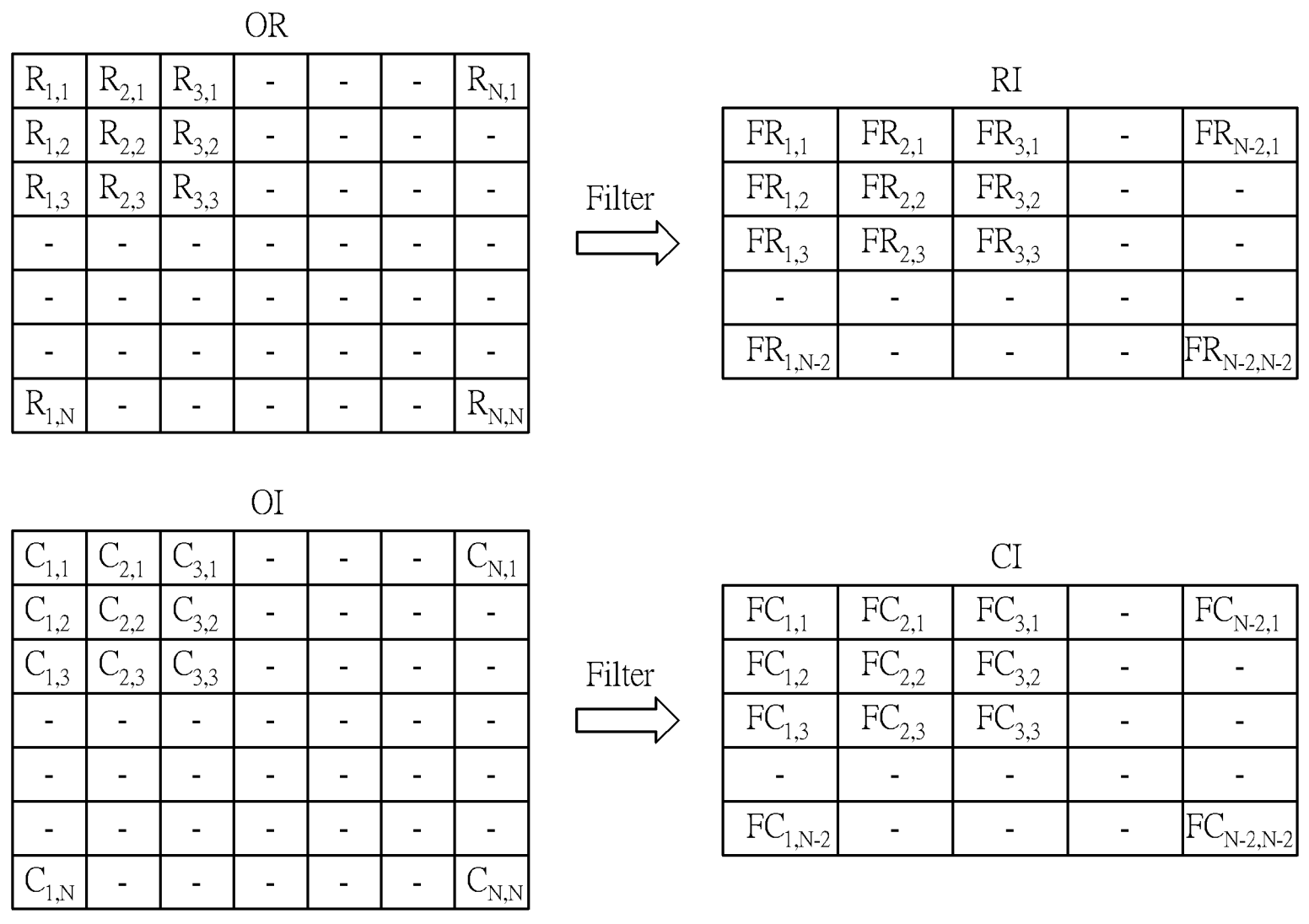

FIG. 7 and FIG. 8 are examples for the operation illustrated in FIG. 6. As shown in FIG. 7, an original reference image OR has N*N pixels, and is filtered to generate a reference image RI having (N−2)*(N−2) pixels. Also, an original image OI has N*N pixels, and is filtered to generate a compute image CI having (N−2)*(N−2) pixels. After that, the reference image RI and the compute image CI are subtracted to generate a subtraction image shown in FIG. 8. As shown in FIG. 8, the subtraction image indicates differences between the reference image RI and the compute image CI. ABS means an absolute difference, for example, $ABS(FR_{1,1}-FC_{1,1})$ means the absolute difference between the pixel $FR_{1,1}$ of the reference image RI and the pixel $FC_{1,1}$ of the compute image CI.

Figure 9:
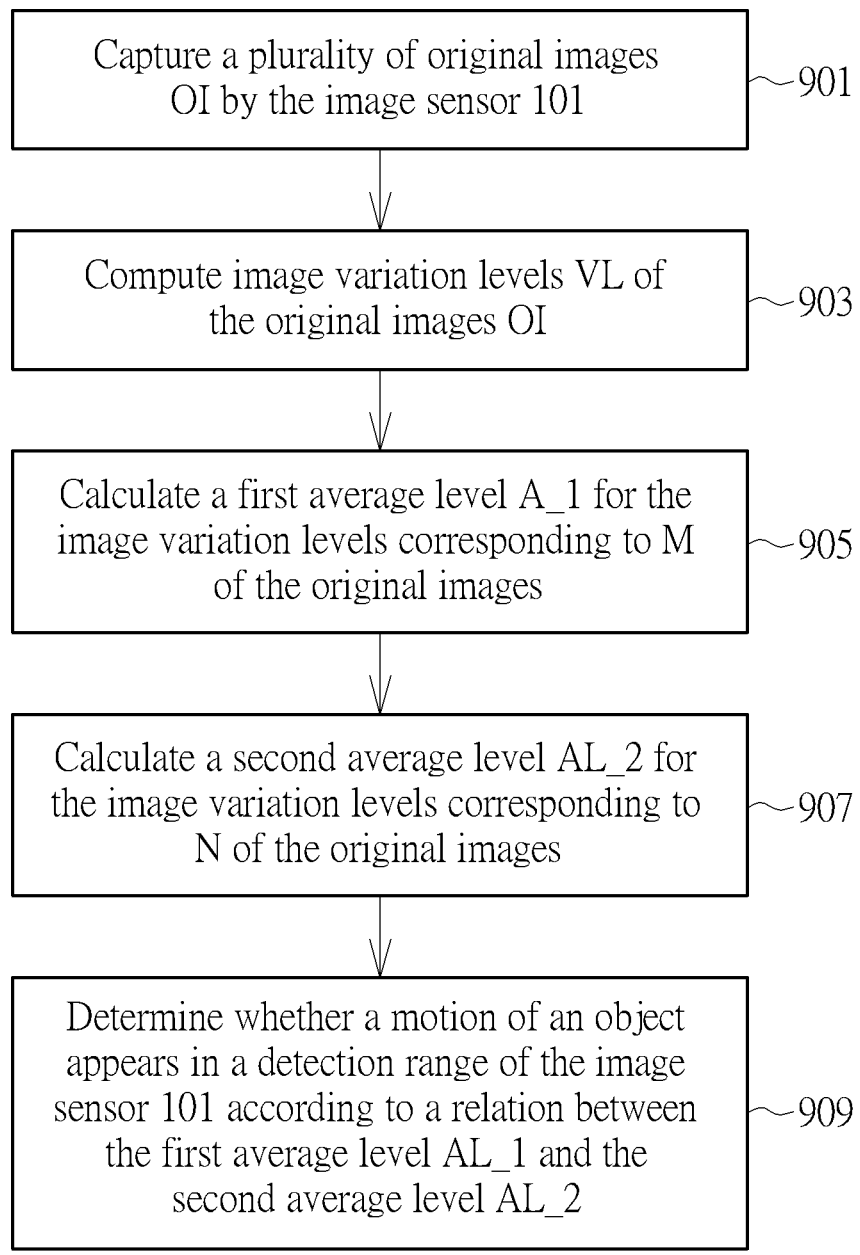
FIG. 9 is a flow chart illustrating a motion detecting method according to one embodiment of the present invention.

In view of above-mentioned embodiments, a motion detecting method for a security camera comprising an image sensor, such as the security camera 100 in FIG. 1 or the security camera 400 in FIG. 4, can be acquired. The motion detecting method comprises following steps illustrated in FIG. 9:

Step 901

Capture a plurality of original images OI by the image sensor 101.

Step 903

Compute image variation levels VL of the original images OI.

Step 905

Calculate a first average level A_1 for the image variation levels corresponding to M of the original images.

Step 907

Calculate a second average level AL_2 for the image variation levels corresponding to N of the original images, wherein M>N.

Step 909

Determine whether a motion of an object appears in a detection range of the image sensor 101 according to a relation between the first average level AL_1 and the second average level AL_2.

In view of above-mentioned argument, the interference caused by noise or small object can be avoided. Accordingly, the motion detection of the security camera can be more accurate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A security camera with a motion detection function, comprising:
    an image sensor, configured to capture a plurality of original images;
    a variation level computation circuit, configured to compute image variation levels of the original images;
    a long term computation circuit, configured to calculate a first average level for the image variation levels corresponding to M of the original images;

a short term computation circuit, configured to calculate a second average level for the image variation levels corresponding to N of the original images, wherein M>N; and a motion determining circuit, configured to determine whether a motion of an object occurs in a detection range of the image sensor according to a relation between the first average level and the second average level;

wherein the security camera records images or generates a message to inform a user if the motion determining circuit determines the motion of the object occurs;

wherein the variation level computation circuit computes the image variation levels of the original images according to image variation levels corresponding to each of comparison images and each of reference images;

wherein the comparison images correspond to the original images, and the reference images correspond to original reference images among the original images.

2. The security camera of claim 1, wherein the motion determining circuit determines whether the motion of the object occurs in the detection range of the image sensor according to a relation between a motion threshold and a difference between the first average level and the second average level.

3. The security camera of claim 2, wherein the motion threshold has inverse association with detection range.

4. The security camera of claim 2, wherein the image sensor comprises a plurality of sensing regions, wherein at least two sensing regions have different motion thresholds.

5. A motion detecting method for a security camera comprising an image sensor, comprising:

(a) capturing a plurality of original images by the image sensor;

(b) computing image variation levels of the original images;

(c) calculating a first average level for the image variation levels corresponding to M of the original images;

(d) calculating a second average level for the image variation levels corresponding to N of the original images, wherein M>N;

(e) determining whether a motion of an object occurs in a detection range of the image sensor according to a relation between the first average level and the second average level; and (f) recording images or generating a message to inform a user if the step (e) determines the motion of the object occurs;

wherein the step (b) computes the image variation levels of the original images according to image variation levels corresponding to each of comparison images and each of reference images;

wherein the comparison images correspond to the original images, and the reference images correspond to original reference images among the original images;

wherein the image sensor comprises a plurality of sensing regions, wherein different ones of the sensing regions have different ones of the motion thresholds.

6. The motion detecting method of claim 5, wherein the step (e) determines whether the motion of the object occurs in the detection range of the image sensor according to a relation between a motion threshold and a difference between the first average level and the second average level.

7. The motion detecting method of claim 6, wherein the motion threshold has inverse association with the detection range.

* * * * *